United States Patent
Schwedt et al.

(10) Patent No.: US 9,588,326 B2
(45) Date of Patent: Mar. 7, 2017

(54) CONFOCAL INCIDENT-LIGHT SCANNING MICROSCOPE WITH MEANS FOR FREQUENCY CONVERSION

(75) Inventors: Daniel Schwedt, Welmar (DE); Ralf Wolleschensky, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 287 days.

(21) Appl. No.: 14/130,966

(22) PCT Filed: Jul. 5, 2012

(86) PCT No.: PCT/EP2012/063125
§ 371 (c)(1),
(2), (4) Date: Jan. 6, 2014

(87) PCT Pub. No.: WO2013/007591
PCT Pub. Date: Jan. 17, 2013

(65) Prior Publication Data
US 2014/0133011 A1 May 15, 2014

(30) Foreign Application Priority Data
Jul. 8, 2011 (DE) .................. 10 2011 106 916

(51) Int. Cl.
*G02B 26/00* (2006.01)
*G02F 1/29* (2006.01)
(Continued)

(52) U.S. Cl.
CPC ..... *G02B 21/0076* (2013.01); *G02B 21/0032* (2013.01); *G02F 1/29* (2013.01); *G02F 1/353* (2013.01)

(58) Field of Classification Search
CPC G02F 1/29; G02F 1/292; B82Y 20/00; G02B 27/48; G02B 26/0816
(Continued)

(56) References Cited

U.S. PATENT DOCUMENTS 6,282,020 B1 8/2001 Ogino
6,888,674 B1 5/2005 Birk et al.
(Continued)

FOREIGN PATENT DOCUMENTS

DE 197 33 195 2/1999
DE 198 29 954 1/2000
(Continued)

OTHER PUBLICATIONS

A.L. Glebov et al.; *Angle Selective Enhancement of Beam Deflection in High-Speed Electrooptic Switches*; IEEE Photonics Technology Letters 19, 701 (May 1, 2007).
(Continued)

*Primary Examiner* — Bumsuk Won
*Assistant Examiner* — Tamara Y Washington
(74) *Attorney, Agent, or Firm* — Frommer Lawrence & Haug LLP

(57) ABSTRACT

A microscope which makes possible a spectrally-flexible excitation and detection of fluorescence in an economical manner. For this purpose, means for frequency conversion are arranged in the common beam path and a filter for excitation light is arranged in addition to the main beam splitter in the detection beam path. The frequency conversion achieves a spectral delimitation between illumination light, which is emitted by the light source, and excitation light which brings about fluorescence excitation in the specimen. Because the frequency conversion takes place in the common beam path after the main beam splitter, it is possible for both a spatial separation of illumination light, and excitation light and fluorescent light (detection light) emitted by the specimen, to be carried out in an economical manner at the main beamsplitter according to spectral bands because of the spectral difference between illumination light and excitation light.

23 Claims, 10 Drawing Sheets

(51) Int. Cl.
*G02B 21/00* (2006.01)
*G02F 1/35* (2006.01)

(58) Field of Classification Search
USPC .................................................. 359/290–298
See application file for complete search history.

(56) References Cited

U.S. PATENT DOCUMENTS

| | | | |
|---|---|---|---|
| 7,202,993 | B2 | 4/2007 | Tauser et al. |
| 2004/0036838 | A1* | 2/2004 | Podoleanu ............. A61B 3/102 351/206 |
| 2004/0065845 | A1* | 4/2004 | Seyfried ............ G01N 21/6458 250/458.1 |
| 2006/0146898 | A1 | 7/2006 | Tauser et al. |
| 2008/0192339 | A1 | 8/2008 | Kubo |
| 2009/0225409 | A1* | 9/2009 | Ilev .................... G02B 21/0084 359/385 |
| 2011/0199676 | A1 | 8/2011 | Alastair et al. |

FOREIGN PATENT DOCUMENTS

| | | |
|---|---|---|
| DE | 10 201 388 | 3/2003 |
| DE | 10 2004 009 066 | 12/2004 |
| EP | 1959292 | 8/2008 |
| WO | WO 01/75422 | 10/2001 |
| WO | WO 2008/053190 | 5/2008 |

OTHER PUBLICATIONS

B.R. Rankin et al.; *STED microscopy with a MHz pulsed stimulated-Raman-scattering source;* Optics Express; vol. 17, No. 18 (Aug. 31, 2009).

Haohua Tu et al.; *Ultraviolet-visible non-supercontinuum ultrafast source enabled by switching single silicon strand-like photonic crystal fibers;* Optics Express ; vol. 17, No. 20, (Sep. 28, 2009).

Haohua Tu et al.; *Optical frequency up-conversion by supercontinuum-free widely-tunable fiber-optic Cherenkov radiation;* Optics Express vol. 17, No. 12, ( Jun. 8, 2003).

B. Agate et al.; *Highly efficient blue-light generation from a compact diode-pumbed femtosecond laser by use of a periodically poled KTP waveguide crystal;* Optics Letters; vol. 28, No. 20 (Oct. 15, 2003).

Myaing M. T. et al.: "Enhanced two-photon biosensing with double-clad photonic crystal fiber" Optics letter/vol. 28. No. 14/Jul. 15, 2013—XP003005553.

English translation of the International Preliminary Report on Patentability for PCT/EP2012/063125 dated Jan. 23, 2014.

International Search Report for Application No. PCT/EP2012/063125 dated Oct. 8, 2012.

German Search Report for Application No. 10 2011 106 916.3 dated May 25, 2012.

\* cited by examiner

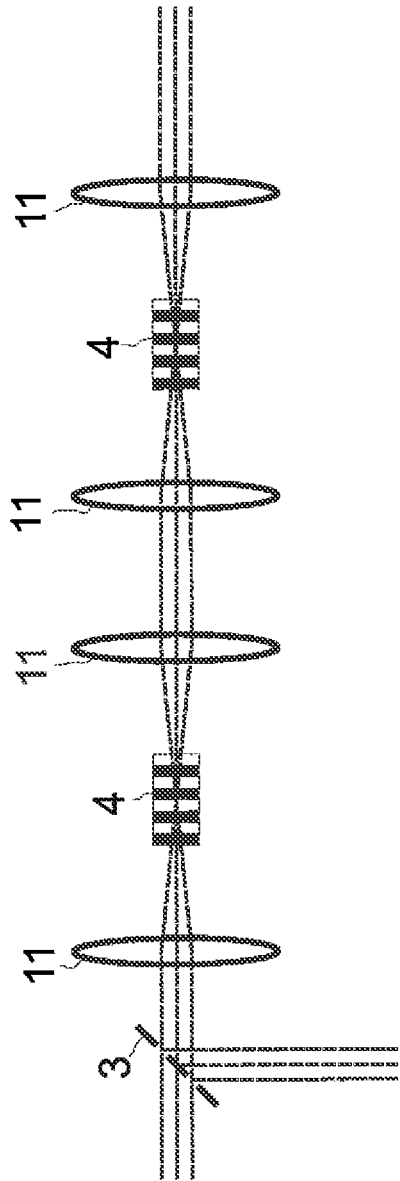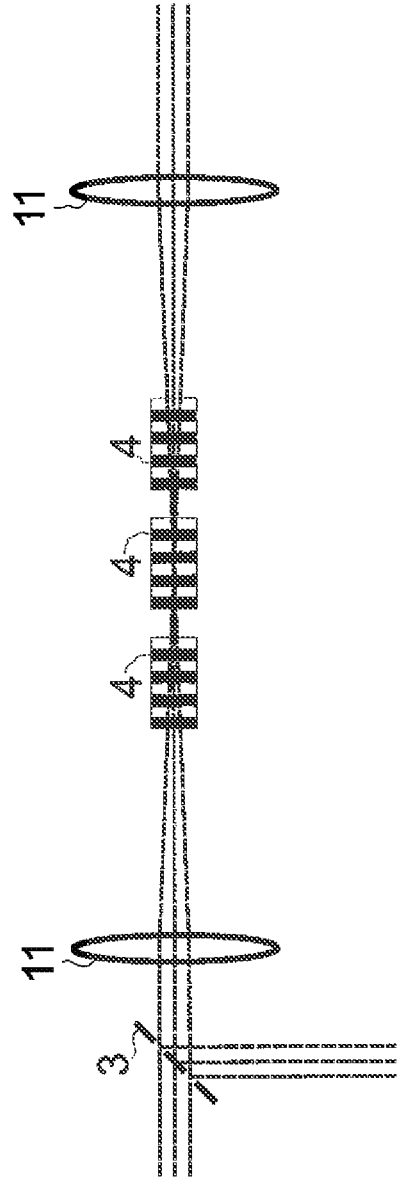

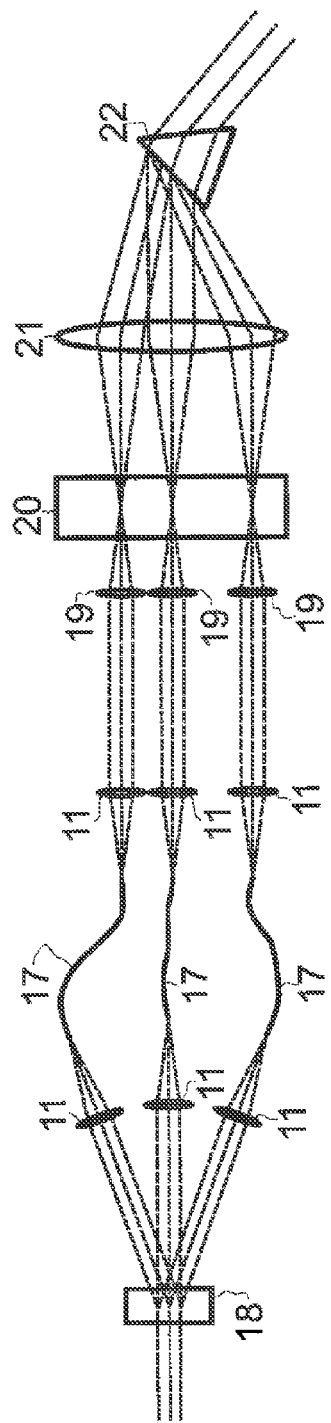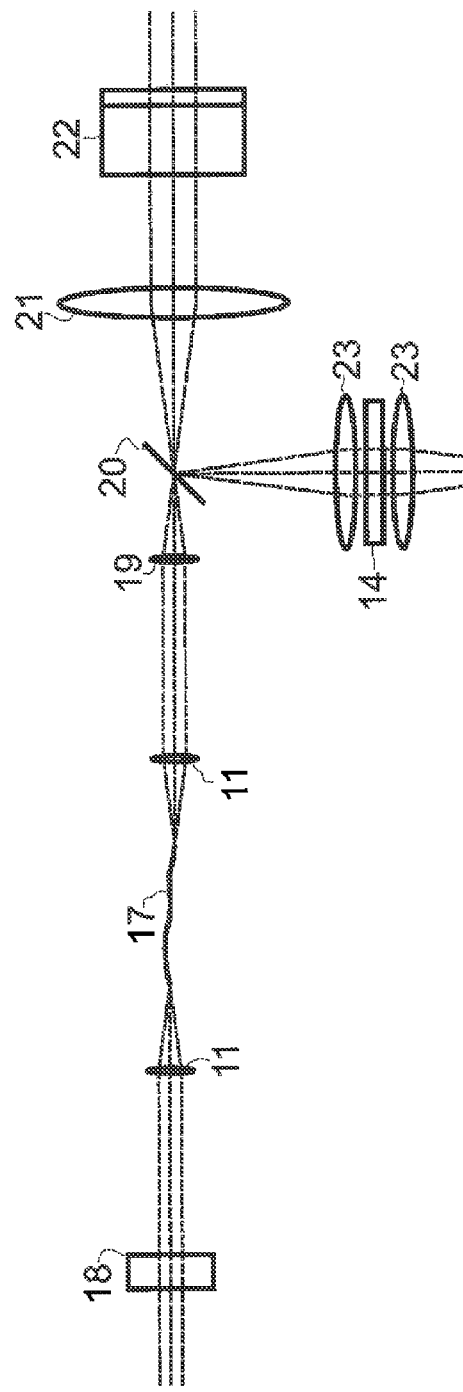
Fig. 8A
Fig. 8B sa# CONFOCAL INCIDENT-LIGHT SCANNING MICROSCOPE WITH MEANS FOR FREQUENCY CONVERSION The present application claims priority from PCT Patent Application No. PCT/EP2012/063125 filed on Jul. 5, 2012, which claims priority from German Patent Application No. DE 10 2011 106 916.3 filed on Jul. 8, 2011, the disclosures of which are incorporated herein by reference in their entirety.

FIELD OF THE INVENTION

The invention is directed to a confocal scanning microscope for fluorescence excitation by means of excitation light having an illumination beam path, a detection beam path, a main beamsplitter which couples part of the illumination beam path and part of the detection beam path to form a common beam path, and an adjustable deflection unit in the common beam path.

It is noted that citation or identification of any document in this application is not an admission that such document is available as prior art to the present invention.

Within the meaning of the invention, excitation light is light which includes a wavelength range suitable for fluorescence excitation in a respective fluorescent dye. A light source—usually a laser (Laser Scanning Microscope, or LSM)—is to be arranged in the illumination beam path. This light source emits illumination light that is typically initially intensity-modulated and/or spectrally filtered and then guided, as excitation light for fluorescence excitation, through the objective onto a specimen. The deflection unit serves to scan the specimen along a raster, during which confocal light from the respective scanned specimen location is received by means of a detector arranged in the detection beam path. By confocal is meant that a diaphragm for limiting the light absorption to a small volume on the specimen location is arranged in a plane of the detection beam path conjugate to the specimen-side focal plane of the objective.

The specimen, particularly labeling dyes specifically arranged therein, absorbs part of the excitation light, whereupon it emits fluorescent light, part of which reaches the detection beam path of the microscope as detection light and is detectable therein in an optoelectronic detector. Another part of the excitation light is scattered by the specimen and accordingly likewise arrives in the detection beam path of the microscope, which reduces the detectable contrast. A small portion of the excitation light is additionally scattered or reflected already in the illumination beam path, for example, at optical interfaces, and can therefore also reach the detection beam path in a troublesome manner. The image quality aimed for in a confocal microscope demands a high suppression of excitation light on the return beam path from the specimen to the detector of typically more than five optical densities (OD); at the same time, the detection light should pass to the detector with the least possible obstruction.

To this end, a spectral notch filter is typically used in the prior art as dichroic main beamsplitter. It blocks a narrow spectral band comprising wavelengths of the utilized excitation light from the detector by reflecting it exclusively from the light source into the common beam path and vice versa. Accordingly, wavelengths within the blocked spectral band cannot reach the pure detection beam path. Wavelengths outside of the blocked spectral band penetrate the main beamsplitter virtually unobstructed and arrive in the pure detection beam path. Thus the excitation light is removed from the return beam path from the specimen to the detector, while the detection light passes through the main beamsplitter to the detector. Of course, the notch filter can also be configured alternatively such that it passes the blocked spectral band, while reflecting the spectral residual. In this case, the light source and detector change places correspondingly compared to the aforementioned arrangement.

Under these framework conditions, the multiplicity of dyes for fluorescence labeling of biomedical specimens has increased significantly in recent decades. In particular, the development of protein-based dyes has been spurred because they are especially well suited for examination of living cell cultures which have increasingly become the focus of scientific interest. It may be supposed that it is precisely in the case of living cell cultures that the chemical-physical possibilities of adjusting defined absorption and emission characteristics of dyes are limited. Therefore, it is necessary to select and adjust the light source depending on the dye characteristics instead of basing the choice of dye on the available laser(s) as heretofore.

In a confocal incident light scanning microscope (with coupling of illumination beam path and detection beam path), the spectrally flexible excitation required for optional choice of dyes requires a correspondingly spectrally flexible separation of excitation light and detection light. For spectrally flexible separation, the blocked spectral band must be adjusted to the respective light source or—in case of a light source whose spectral emission characteristics are adjustable, referred to hereinafter as tunable light source—to the respective adjusted emission characteristics of the light source. In the prior art, a finite quantity of interchangeable main beamsplitters is provided for this purpose, for example, by means of a motor-operated splitter wheel as is described in DE 189 29 954 A1.

It is disadvantageous that, owing to inevitable differences in installation positions, exchanging the main beamsplitter changes the beam paths, which must be compensated in a complicated manner. In addition, it is expensive to provide a plurality of main beamsplitters. Splitter wheels in particular take up valuable installation space. Further, the finite quantity of alternative beamsplitters, for example, in a splitter wheel, limits the spectral flexibility of the separation to a correspondingly small number of selectable spectral bands and therefore dye groups.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

It is the object of the invention to provide a microscope of the type mentioned above which allows a spectrally flexible fluorescence excitation and fluorescence detection of specimens in an economical manner.

To meet the above-stated object, it is provided according to the invention that means for frequency conversion are arranged in the common beam path and a filter for excitation light is arranged in addition to the main beamsplitter in the detection beam path. The filter for excitation light is advisably designed for blocking a spectral band which can be generated in the means for frequency conversion by frequency conversion from light that can be emitted by a respective light source.

The frequency conversion achieves a spectral delimiting between illumination light emitted by the light source and excitation light bringing about fluorescence excitation in the specimen. Since the frequency conversion takes place in the common beam path, i.e., after the main beamsplitter, it is possible for a spatial separation of illumination light on the one hand and excitation light and fluorescent light (detection light) emitted by the specimen on the other hand to be carried out in an economical manner at the main beamsplitter according to spectral bands because of the spectral difference between illumination light and excitation light. The task of the main beamsplitter is not (any longer) to separate excitation light from detection light. Therefore, it need no longer be formed as an inflexible, spectrally specific notch filter, but rather need only block broader bands including the illumination light, or all wavelengths above a suitable spectral edge, from the detector. An edge is suitable when it is spectrally located between the excitation light and the illumination light. A spectral edge filter (optical longpass filter or shortpass filter) is the simplest option for separating illumination light and excitation light.

According to the invention, the excitation light is separated from the detection light by means of the additional optical filter for excitation light. This allows a high spectral flexibility with low expenditure because a filter of this kind is not subject to the strict requirements for a main beamsplitter with respect to installation position. It can likewise be designed as a beamsplitter. The filter for excitation light can be designed as a spectral notch filter and can be spectrally adjustable in an optional manner, for example, in that the spectral position can be varied by varying the orientation of the filter substrate. In particular, it can be formed as a dielectric filter. Alternatively, it can be formed as an acousto-optic tunable filter (AOTF).

The design of the main beamsplitter as neutral splitter in conjunction with a separate filter for illumination light in the pure detection beam path, i.e., outside the common beam path, has the same effect as a spectrally selective main beamsplitter for separating illumination light and excitation light. A filter of this kind can simultaneously be formed as a filter for excitation light in order to separate the excitation light from the detection light; instead of this, it can also be provided in addition to a filter separating excitation light from detection light.

A filter for illumination light is advisably arranged in the illumination beam path downstream of the means for frequency conversion so as to block a residual of the illumination light that has not been frequency-converted from the specimen. A filter of this type can be designed, for example, as the main beamsplitter. In case the main beamsplitter is a neutral splitter, a filter of this type can be designed, for example, as the separate filter for illumination light which is arranged in the pure detection beam path.

A light source arranged in the illumination beam path can be part of the microscope but can also be detachably or permanently connected to the microscope as external module, for example, by means of optical waveguides. In particular, a plurality of light sources can be coupled into the illumination beam path simultaneously or alternately provided that the illumination light emitted by them lies in the portion(s) of the spectrum to be blocked from the detector by the main beamsplitter.

The means for frequency conversion are preferably designed as at least one optically nonlinear medium. For example, a medium of this type can effect a frequency multiplication, particularly a doubling and/or tripling, or can bring about a sum frequency generation or differential frequency generation. This allows a large spectral distance between the illumination light and the excitation light. A conversion of infrared, particularly near infrared (NIR) light, into visible light is preferably carried out.

The optically nonlinear medium is advisably arranged in a focal plane of the common beam path, or at least in the area of such a focal plane, in order to achieve a high light intensity in the medium and, accordingly, a high conversion probability and, consequently, a high fluorescence intensity. It is particularly advisable to arrange the nonlinear medium in the center of a 4f arrangement. A 4f arrangement transforms the beam characteristics of the entrance pupil into the exit pupil without affecting the image forming characteristics of the microscope. For example, ideally, the focal plane, magnification and spherical aberration are not influenced by the 4f arrangement.

For confocal detection, it is advisable when a diaphragm, particularly a pinhole diaphragm or a slit diaphragm, is arranged confocally in the detection beam path, particularly in the common beam path. According to the invention, the confocal diaphragm can be formed by the means for frequency conversion when the latter are arranged in a confocal plane of focus and their light-transparent region has correspondingly small dimensions, which is generally the rule in available nonlinear optical media.

In particularly advantageous embodiment forms, a tunable light source is arranged in the illumination beam path for emission of at least one of a plurality of different first spectral bands (as illumination light), in particular different infrared spectral bands, wherein the filter for the excitation light is adjustable for blocking at least one of various second spectral bands which arise from the frequency conversion from the first spectral bands. In this way, a high spectral flexibility is achieved without needing to change the economical main beamsplitters according to the invention.

According to the invention, a permanently broadband-emitting light source with a band selection filter, for example, an acousto-optic tunable filter, arranged downstream thereof in the illumination beam path can also serve as tunable light source. In general, it is advantageous to arrange an adjustable filter in the illumination beam path for adjusting different spectral bands of illumination light in order to select one of a plurality of simultaneously emitted spectral bands or spectral lines as illumination light. In particular, this can be an acousto-optic tunable filter.

The tunable light source is preferably designed to emit different infrared (first) spectral bands because infrared illumination light can be separated in a highly efficient manner from excitation light made visible by frequency conversion. Correspondingly, the tunable filter for excitation light is advisably designed to block the corresponding infrared second spectral bands.

Further, embodiment forms in which the filter is tiltable with respect to the detection beam path for adjusting one of the (second) spectral bands to be blocked are particularly advantageous. Accordingly, the filter need not be exchanged, which facilitates handling and adjustment and requires little installation space compared to a splitter wheel with different filters. The tiltable filter can be a spectral notch filter in particular. It is known from optical notch filters based on thin film technology that they change their spectral filter characteristics by adjusting the incident angle of the radiation to be filtered. In this way, it is possible to adjust the center filter wavelength by approximately 0% to 10% of the definition wavelength. Owing to the high film quality that can be achieved through new cathode evaporation methods (sputtering), a filter of this type can be optimized, for example, for a regular tilt angle of e.g., 20° relative to the optical axis. The variably adjustable spectral bandwidth and maximum suppression according to the invention are then maintained virtually completely with an angular tuning of +/−20.

The tiltable filter is advisably outfitted with a drive unit for defined tilting of the filter in order to carry out adjustment automatically by means of a control unit.

The microscope according to the invention is advisably outfitted in a known manner with a photodetector in the detection beam path and an objective in the common beam path, wherein the photodetector is arranged outside of the common beam path. Correspondingly, the light source is arranged outside the common beam path insofar as it is operatively connected to the illumination beam path.

Excellent spectral flexibility can be achieved in that the means for frequency conversion are connected to a drive for moving the means for frequency conversion out of the common beam path and into the common beam path, particularly for alternatively moving one of a plurality of means for frequency conversion into the common beam path. In this way, the user can switch off the frequency conversion, or different frequency conversion means are available to the user which are designed, for example, for the purpose of a selectable intensity modulation for frequency conversion of various efficiencies and/or for the purpose of adjusting different wavelengths for different conversion processes.

Preferred means for frequency conversion are at least one of the following elements: periodically poled nonlinear crystals, periodically poled nonlinear optical waveguides, nonlinear photonic crystal fibers.

The common beam path preferably has, in addition to the deflection unit, adjustably deflecting optical elements for temporally sequential spreading of the beam path and for recombining and/or, in addition to the deflection unit, diffractive optical elements for simultaneous spreading of the beam path in order to carry out the frequency conversion differently in a plurality of branches.

The main beamsplitter can advantageously be a two-dimensional matrix of micro-optomechanical systems or a two-dimensional micromirror matrix or a mirror with at least one transmission window. The transmission efficiency of the main beamsplitter can be improved in this way, for example, in connection with linear illumination and linear image recording.

A pulsed infrared laser is preferably used as light source.

The invention also includes a method for operating a confocal scanning microscope for fluorescence excitation, wherein illumination light emitted by a light source in a first spectral band is coupled along an illumination beam path via a main beamsplitter into a common beam path shared by a detection beam path and is converted in the common beam path in means for frequency conversion into a different spectral band as excitation light and guided via a deflection unit and an objective to a specimen from which light is received via the objective along the common beam path and guided via the main beamsplitter and through a filter for the excitation light to a detector, where it is converted optoelectronically, particularly by adjustment of a tunable light source to one of a plurality of first spectral bands and adjustment of the filter for the excitation light to corresponding second spectral bands. The operating method can vary according to the above-mentioned arrangements of the invention. In addition, the invention includes computer programs or control units for a confocal scanning microscope which are (respectively) adapted to implement an operating method of this type.

Accordingly, illumination light can be emitted according to the invention in the illumination beam path, which illumination light differs spectrally from the excitation light required for the respective specimen. The illumination light then advisably comprises (exclusively) wavelengths which are greater than the wavelengths of the required excitation light. Illumination light and excitation light coming from the common beam path can be separated economically at the main beamsplitter. This is achieved, for example, in that the main beamsplitter is formed as a spectral edge filter whose edge lies between the illumination light spectral band emitted by the light source and the corresponding frequency-converted spectral band. The edge filter is advisably arranged such that it allows only wavelengths below the spectral edge to reach the detector from the common beam path, while it blocks wavelengths above the edge from the detector by reflecting them to the light source, for example. Alternatively, the main beamsplitter can be formed as a spectral broadband barrier. The excitation light can be separated from the detection light by means of a filter differing from the main beamsplitter. This filter can be arranged at any location in the detection beam path between the means for frequency conversion and the detector. It can preferably be adjusted spectrally to different light sources or different emission bands of a tunable light source.

Various sources of broadband near infrared laser radiation are known from the art, for example:

mode-locked Ti:sapphire systems with pulse lengths of from a few to several tens of femtoseconds which generate broadband spectra between 700 urn and 1000 nm, two-crystal lasers which make the spectral regions of Ti:sapphire-chromium-doped crystals usable simultaneously, high-gain pulsed fiber lasers which cause the generation of new frequency components in highly nonlinear fibers (HLNF), and the generation of new frequency components via stimulated Raman scattering through high-power lasers.

Further, efficient frequency conversion mechanisms by means of periodically poled nonlinear crystals are known. The periodic poling causes an expansion of the phase matching conditions. Further, methods are known for fashioning these periodically poled crystals as waveguides so that the conversion efficiency is very highly increased. Further, frequency conversion mechanisms in highly nonlinear photonic crystals are known which, owing to blue-shifted zero dispersion wavelengths, cause a deceleration of the NIR laser pulse which emits its excess energy in the form of dispersive waves in visible spectral regions. As a result of phase matching conditions between zero dispersion and laser wavelength, bandwidth of the emitted bremsstrahlung is narrowed (less than 20 nm) and is distinctly separated from the NIR radiation of the laser (wavelength less than zero dispersion wavelength). In addition, there are known frequency conversion techniques which generate visible continuum spectra via photonic crystal fibers but which have limitations with respect to spectral contrasts in the excitation light, long-term lifetimes of the laser systems due to fiber degradation and intensity stability. (Sources: B. Agate et al., Optics Letters 28, 1963, 2003; Haohua Tu et al., Optics Express 17, 17983, 2009; B. R. Rankin et al., Optics Express 17, 15679, 2009; A. L. Glebov et al., IEEE Photonics Technology Letters 19, 701, 2007).

The invention can be advantageously expanded by the following features:
- an AOTF for adjusting the laser power of the NIR pump light source,
- a motorized holder of the utilized nonlinear medium for exchanging and/or adapting to changed spectral settings of the pump light source,
- a periodically poled nonlinear crystal for frequency conversion of the NIR pump light source,
- a plurality of successively arranged periodically poled nonlinear crystals,
- a plurality of periodically poled nonlinear crystals arranged in parallel beam paths,
- a periodically poled nonlinear waveguide for frequency conversion of the NIR pump light source,
- a periodically poled nonlinear waveguide with chirped periods for simultaneous frequency conversion of a plurality of spectral components of the NIR pump light source,
- a highly nonlinear photonic crystal fiber for frequency conversion of the NIR pump light source,
- a polarization-maintaining highly nonlinear photonic crystal fiber for frequency conversion of the NIR pump light source,
- a plurality of (polarization maintaining) highly nonlinear photonic crystal fibers arranged in parallel beam paths,
- scanning optical elements (AODs, galvanometer scanners, EO prisms, MOEMS) for temporally sequential angular spreading of the beam path,
- diffractive optical elements (DOE) for simultaneous angular spreading of the beam path,
- a two-dimensional MOEMS matrix for beam splitting between excitation beam path and detection beam path inside a prism spectrometer,
- a two-dimensional micromirror matrix for beam splitting between excitation beam path and detection beam path inside a prism spectrometer,
- a mirror with transmission windows for beam splitting between excitation beam path and detection beam path inside a prism spectrometer,
- a mirrored plate provided with holes for beam splitting between excitation beam path and detection beam path inside a prism spectrometer,
- a prism or grating for combining different spectral components of the excitation light in a common beam path or for resolving fluorescence radiation into its spectral component parts for spectrally resolved detection,
- GRIN optics at the output of the photonic crystal fibers for matching the exit aperture,
- a (programmable) phase mask between two beam-expanding telescopes for spatially selected focusing of the broadband NIR laser radiation on the core of photonic crystals inside a fiber bundle,
- a Ti:sapphire laser as NIR pump light source,
- a fs fiber laser as NIR pump light source,
- a wavelength comb of an ns laser in NIR as NIR pump light source, which wavelength comb is generated in NIR by stimulated Raman scattering,
- a shortpass filter for reflecting the NIR pump light source into the fluorescence beam path,
- a longpass filter for reflecting the fluorescence beam path out of the beam path of the NIR pump light source,
- a detection pinhole diaphragm with adapted, collimated imaging optics.

BRIEF DESCRIPTION OF THE DRAWINGS

FIG. 4 shows schematically two arrangements which simultaneously generate different wavelength bands in the visible spectral region from an individual broadband NIR laser source by frequency conversion in periodically poled nonlinear crystals;

FIG. 8 shows an arrangement in which different wavelength bands in the visible spectral region are generated simultaneously or temporally sequentially in angularly spread partial beam paths from an individual broadband NIR laser source in different highly nonlinear photonic crystal fibers;

Corresponding parts are designated by the same reference numerals in all of the drawings.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
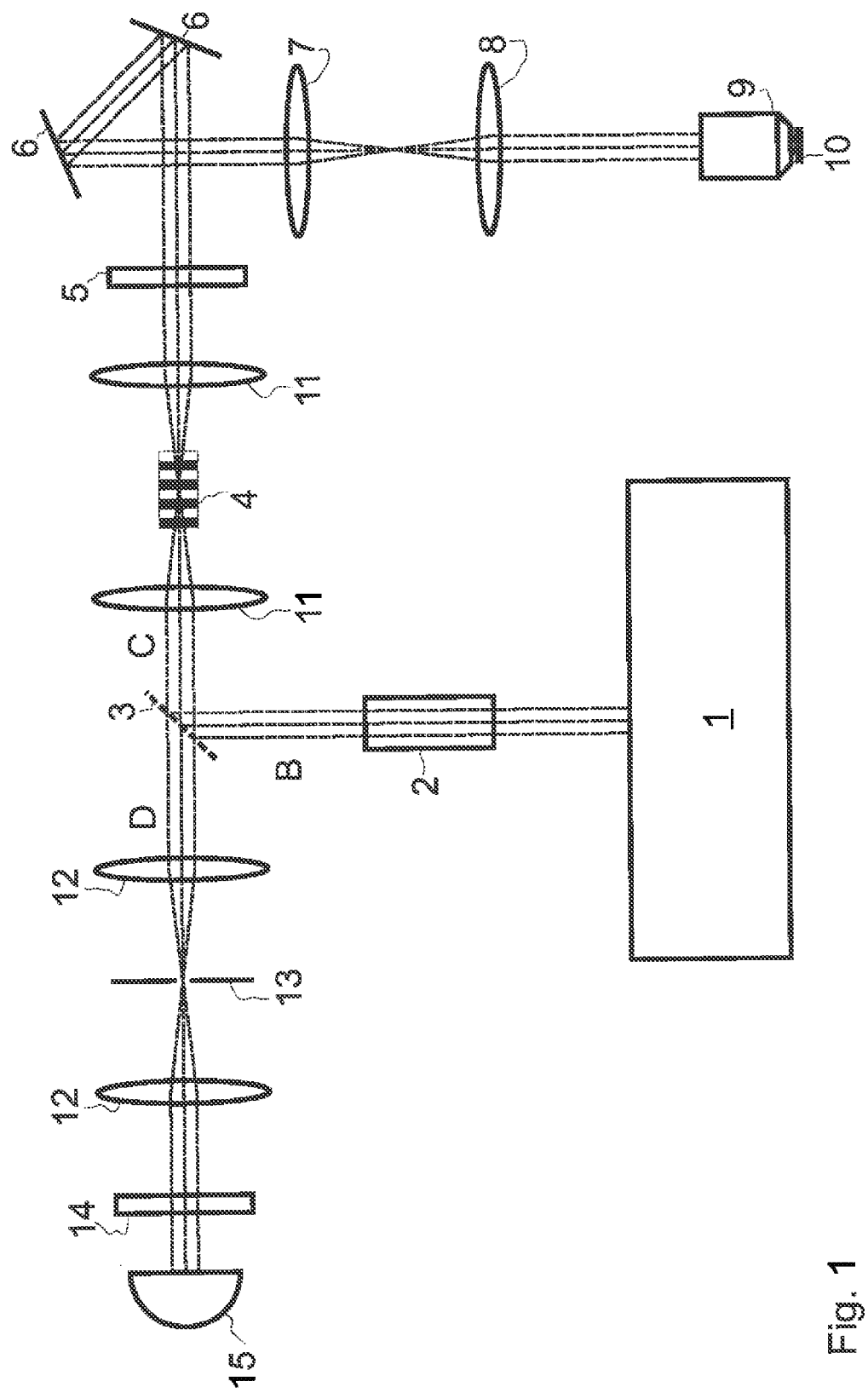
FIG. 1 shows schematically a LSM in which the frequency of a NIR laser reflected in by means of a shortpass is doubled in a periodically poled nonlinear crystal.

FIG. 1 shows an exemplary LSM with a NIR laser as light source 1 in the illumination beam path B. The light generated through the spectrally broadband NIR laser 1 is preselected by means of an AOTF as filter 2 having a filter function of several nanometers bandwidth into desired first spectral regions whose intensity is adjusted, in addition, via the power of the applied acoustic wave. The illumination light accordingly arriving in the illumination beam path is reflected into the common beam path C (fluorescence beam path) by means of an optical shortpass as main beamsplitter 3. A downstream 4f lens system 11 generates a beam waist in which a periodically poled nonlinear crystal 4 made, for example, of lithium niobate whose crystal orientation and poling period is matched to the selected laser spectrum from first spectral bands for frequency doubling into associated second spectral bands is arranged as means for frequency conversion. It is possible to optimize the phase matching by tempering the crystal 4. Further, a plurality of crystals 4 (not shown) can be exchanged for one another in a motorized manner depending on the required excitation spectrum. Residual NIR laser light is blocked by a downstream NIR blocking filter 5. The deflection unit has, for example, galvanometer mirrors 6 and scans the specimen 10 to be examined in a known manner with a laser spot generated by the downstream lens arrangement comprising a scanning objective 7, tube lens 8 and microscope objective 9. Fluorescent light emitted by the specimen 10 passes through the LSM as detection light initially in the opposite direction so that a stationary, collimated beam path is generated behind the mirrors 6. The filter characteristics of the NIR blocking filter 5 are so configured that visible fluorescent light can pass unobstructed. The periodically poled nonlinear crystal 4 also comprises a highly transparent medium in the visible spectral region to be detected. After passing the shortpass main beamsplitter 3, the detection light is imaged by a further 4f lens system 12 within whose beam waist the confocal pinhole 13 is positioned. Excitation light backscattered by the specimen 10 (the excitation light is visible because it is frequency-doubled light) is blocked from the detector 15 in the pure detection beam path D by correspondingly inserted notch filters 14 which are optimized by angle matching if required.

Figure 2:
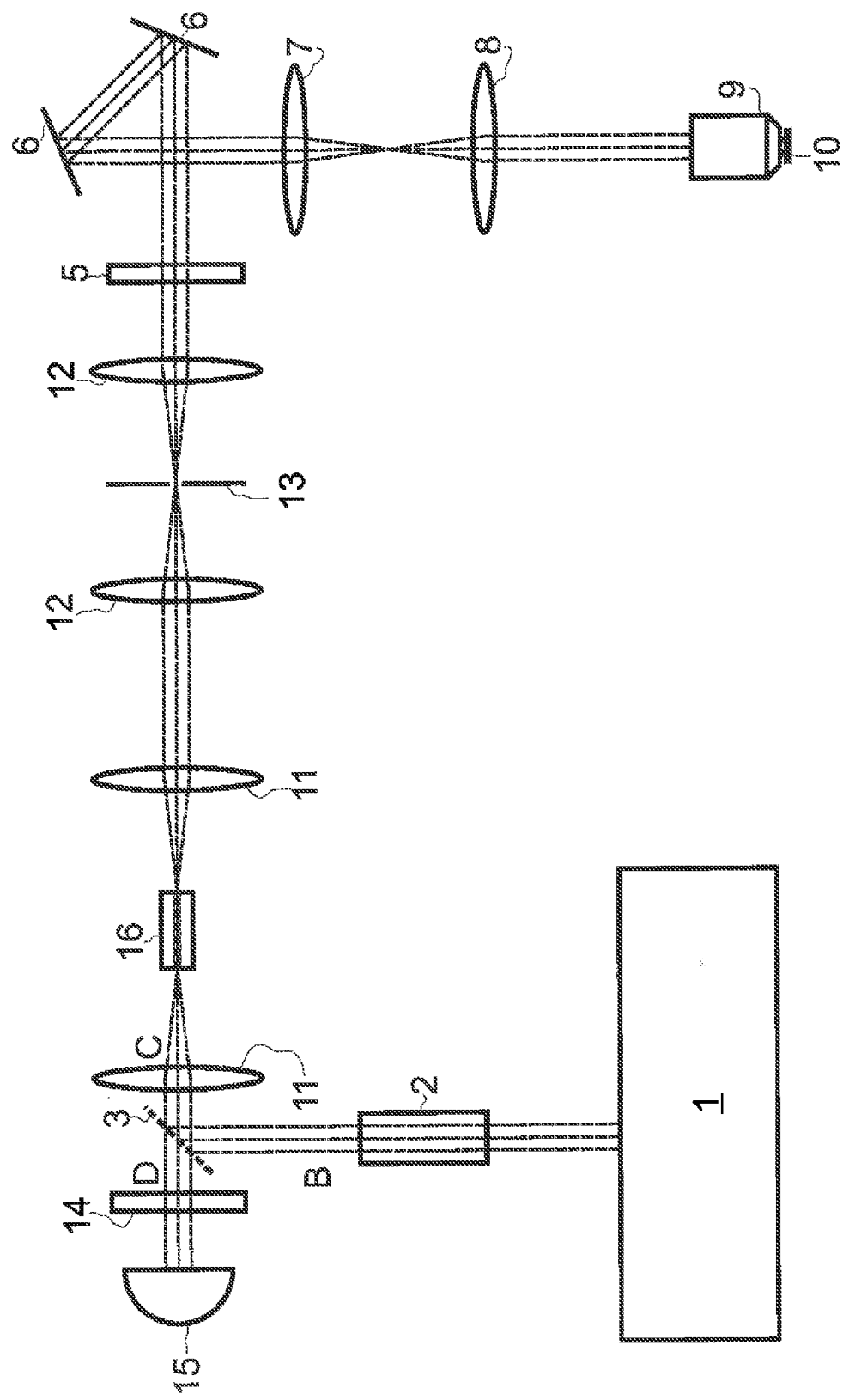
FIG. 2 shows a LSM in which the frequency of a NIR laser reflected in by means of a shortpass is doubled in a periodically poled nonlinear waveguide on the fluorescence beam path.

FIG. 2 shows another LSM in which the light generated by the spectrally broadband NIR laser 1 is preselected by means of an AOTF having a filter function of several nanometers bandwidth into desired first spectral regions whose intensity is adjusted in addition via the power of the applied acoustic wave. The illumination light accordingly arriving in the illumination beam path B is reflected into the common beam path C by means of a shortpass as main beamsplitter 3. A subsequent 4f lens system 11 generates a beam waist in which is positioned a periodically poled nonlinear waveguide 16 as means for frequency conversion into second spectral regions. Ideally, the periodically poled waveguide 16 has a so-called chirped poling. Thus the frequency of the poling period varies and the spectral conditions of optimal phase matching are accordingly shifted along the waveguide 16. Since a waveguide acts like a spatial filter, this arrangement is positioned between the confocal pinhole 13 and the detector 15. A further 4f lens system is positioned downstream, the confocal pinhole 13 being positioned in the beam waist thereof. Residual NIR laser light is blocked by a downstream NIR blocking filter 5. The deflecting mirrors 6 scan the specimen 10 to be examined with a laser spot generated by the downstream lens arrangement comprising a scanning objective 7, tube lens 8 and microscope objective 9. Fluorescent light emitted by the specimen 10 passes through the arrangement initially in the opposite direction as detection light so that a stationary, collimated beam path is generated behind the deflecting mirrors 6. The filter characteristics of the NIR blocking filter 5 are so configured that visible detection light can pass unobstructed. The fluorescence is then imaged in the confocal pinhole 13 and subsequently collimated again. The periodically poled nonlinear waveguide 16 comprises a highly transparent medium in the visible spectral region. After passing the shortpass filter 3, the detection light in the detection beam path D outside the common beam path C is cleansed of excitation light backscattered by the specimen 10 (the excitation light is visible because it is frequency-doubled light) by correspondingly inserted notch filters 14 which are optimized by angle matching if required, and is finally recorded by the detector 15.

Figure 3:
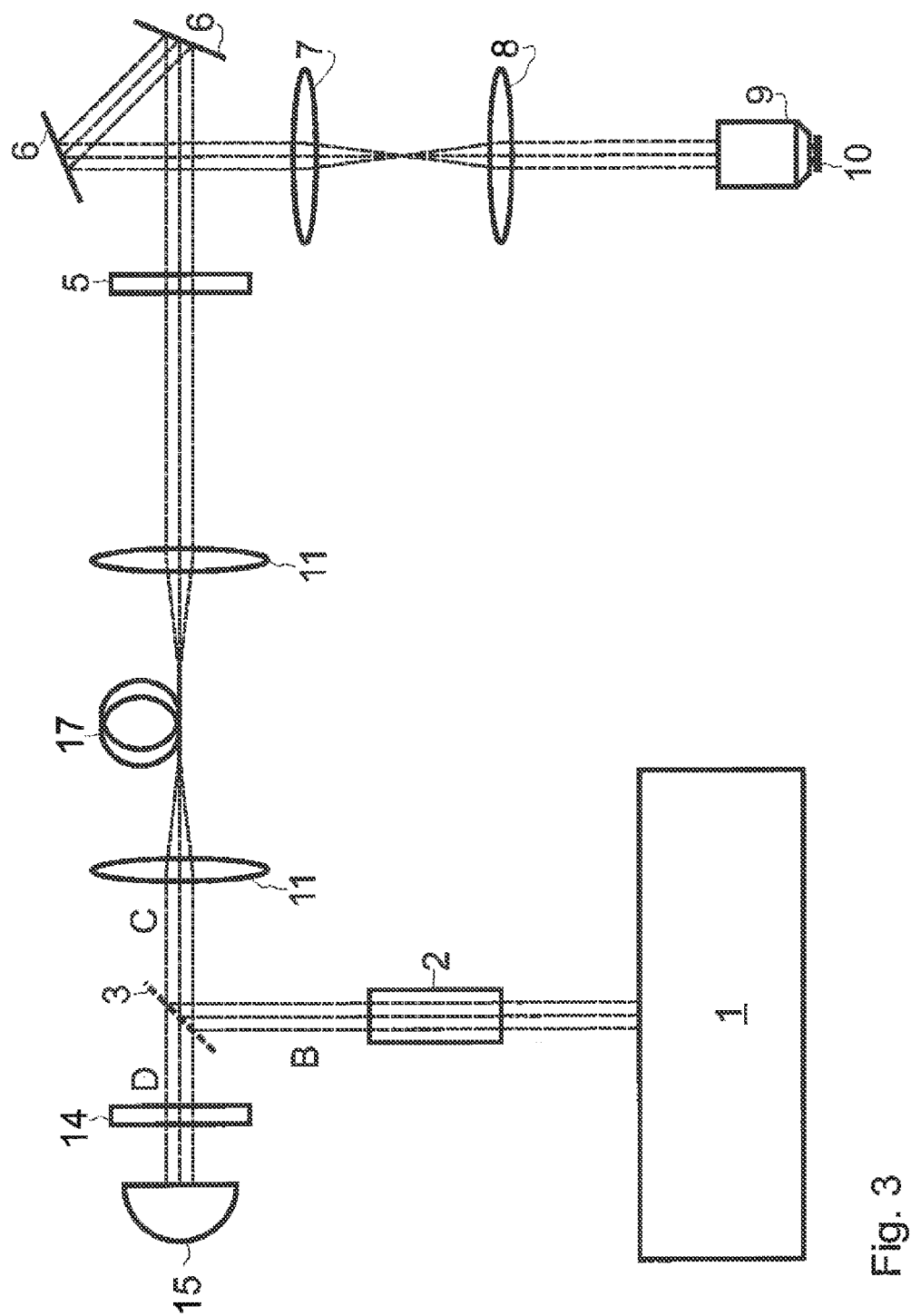
FIG. 3 shows a LSM in which a NIR laser reflected in by means of a shortpass is coupled into a highly nonlinear photonic crystal fiber on the fluorescence beam path within which the excitation light occurs due to energy dissipation.

Another exemplary LSM is shown in FIG. 3. The light generated by the spectrally broadband NIR laser 1 is preselected by means of an AOTF 2 having a filter function of several nanometers bandwidth into desired first spectral regions whose intensity is adjusted in addition via the power of the applied acoustic wave. The illumination light accordingly arriving in the illumination beam path is reflected into the common beam path C by means of a shortpass 3. A subsequent 4f lens system 11 generates a beam waist in which is positioned a highly nonlinear photonic crystal fiber 17 as means for frequency conversion. The fiber 17 can be exchanged for other fibers of similar construction (not shown) in a motorized manner, but with varied zero dispersion wavelength. The input aperture of the fiber 17 acts simultaneously in this case as an excitation and detection pinhole. Residual NIR laser light is blocked by a downstream NIR blocking filter 5. As is known from diverse older patents, the scanner mirrors 6 scan the specimen 10 to be examined with the laser spot generated by the downstream lens arrangement comprising scanning objective 7, tube lens 8 and microscope objective 9. Fluorescent light emitted by the specimen 10 passes through the arrangement initially in the opposite direction as detection light so that a stationary, collimated beam path is generated behind the mirrors 6. The filter characteristics of the NIR blocking filter 5 are so configured that visible detection light can pass unobstructed. The highly nonlinear photonic crystal fiber 17 comprises a highly transparent medium in the visible spectral region. After passing the shortpass filter 3, the detection light is cleansed of excitation light backscattered from the specimen 10 (the excitation light is visible because it is frequency-doubled light) by correspondingly inserted notch filters 14 which are optimized by angle matching if required, and is finally recorded by the detector 15.

FIG. 4 shows two variants for simultaneous generation of different separate spectral regions of visible excitation light through frequency conversion in periodically poled nonlinear crystals 4 which are arranged one behind the other. The arrangement of one of the variants as means for frequency conversion within the microscope beam path has been omitted because it is identical to that shown in FIG. 1. In addition, imaging means 4a generate a separate beam waist for each nonlinear crystal 4 via a correspondingly associated pair of lenses 11. This has the advantage that the frequency conversion process is carried out for each addressed spectral region with the highest possible efficiency. However, a drawback consists in that longitudinal chromatic aberrations are accordingly added when passing through the lens system. This means that the axial overlapping of the point spread functions (PSF) of different spectral components in the specimen will worsen the more frequency components are to be generated simultaneously. This disadvantage is eliminated at the expense of conversion efficiency by using only one pair of lenses 11, but with long focal length lenses 11, which generates a beam waist with larger Rayleigh length so that a plurality of periodically poled nonlinear crystals can be arranged therein one behind the other for frequency conversion. This kind of arrangement requires a higher pulse energy in the relevant fundamental spectral regions.

Figure 5:
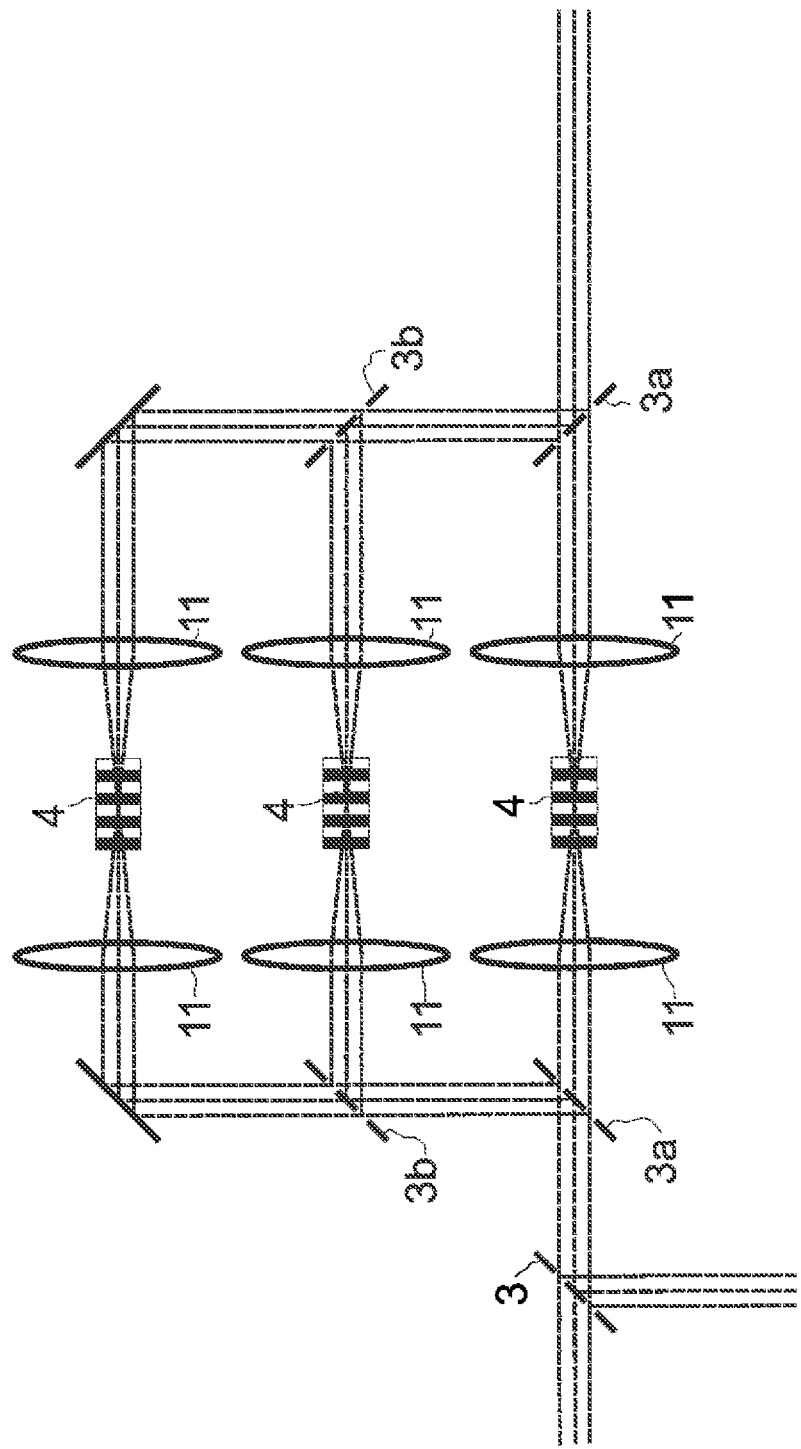
FIG. 5 shows an arrangement in which different wavelength bands in the visible spectral region are generated simultaneously in parallel partial beam paths from an individual broadband NIR laser source by frequency conversion in periodically poled nonlinear crystals.

FIG. 5 shows another possibility for generating different spectral components of visible excitation light from a broadband NIR laser source. The arrangement of these means for frequency conversion in the microscope beam path is again carried out analogous to FIG. 1. In this case, the various periodically poled nonlinear crystals 4 are arranged in parallel partial beam paths which are generated through bandpasses or edge filters 3a, 3b. A lens pair 11 generates the required beam waist in each of these beam paths.

Figure 6:
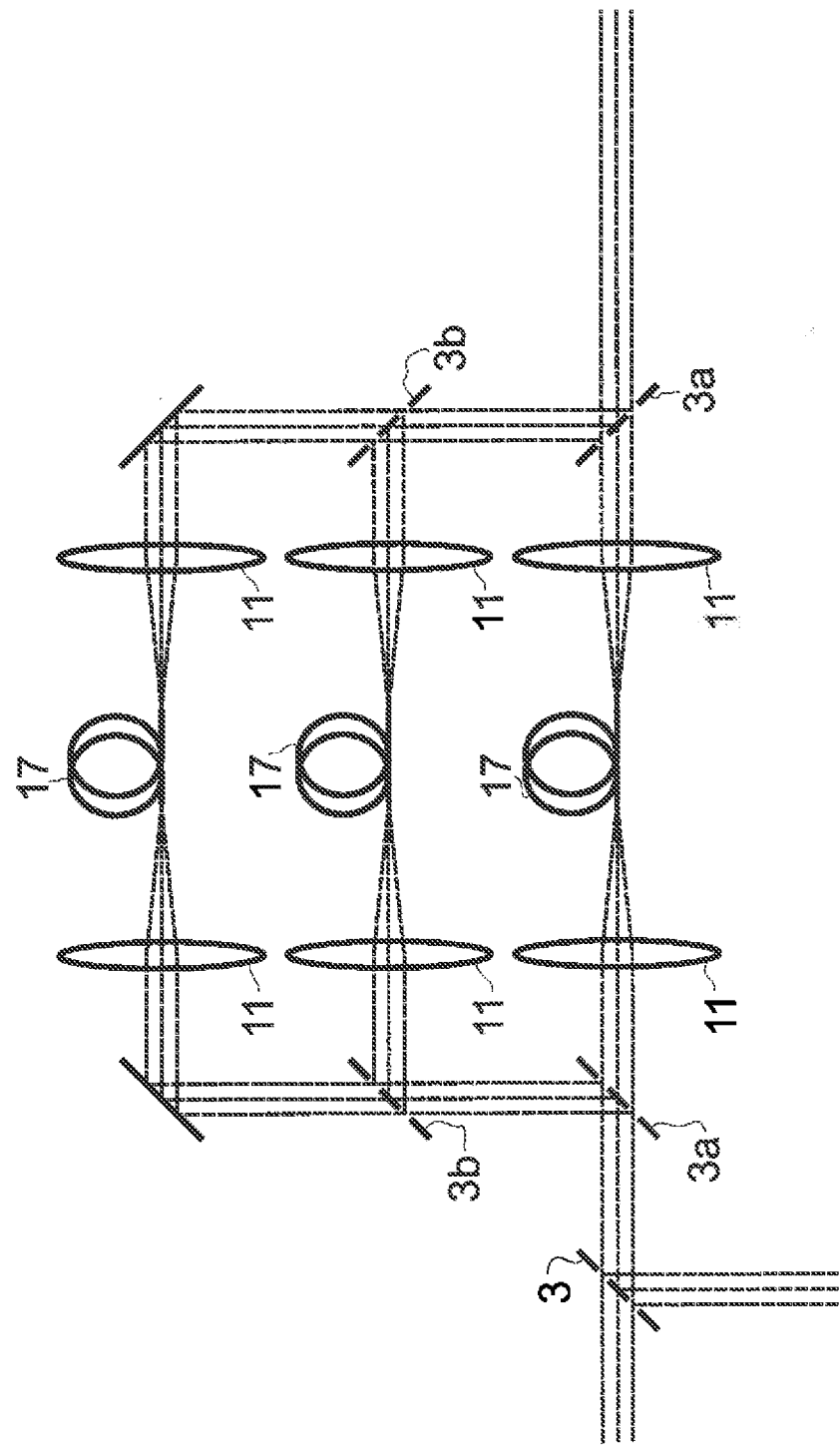
FIG. 6 shows an arrangement in which different wavelength bands in the visible spectral region are generated simultaneously in parallel partial beam paths from an individual broadband NIR laser source in different highly nonlinear photonic crystal fibers.

FIG. 6 shows a further arrangement as means for frequency conversion of NIR illumination light into different spectral regions of the visible spectrum for the purpose of fluorescence excitation. This follows the beam splitting principle from FIG. 5. However, in this case the lens pairs 11 couples the laser illumination light of a first spectral region in the NIR into highly nonlinear photonic crystal fibers 17, and the laser pulses generate new spectrally narrowband frequency components in the visible second spectral region by radiation of dispersive waves. Further, the reflection characteristics of beamsplitters 3a and 3b are more complicated. In the visible portion of the spectrum, they act as dichroic bandpasses or edge filters. However, in the NIR they act as neutral beamsplitters with adapted splitting ratio (in the present case a splitting ratio of T=0.33/R=0.66 for beamsplitter 3a and T=R=0.5 for beamsplitter 3b would be ideal). In other embodiment forms (not shown), the "ladder" of the parallel beam paths is not limited to three rungs, but rather is only limited by the power density of the NIR pump light source.

Figure 7:
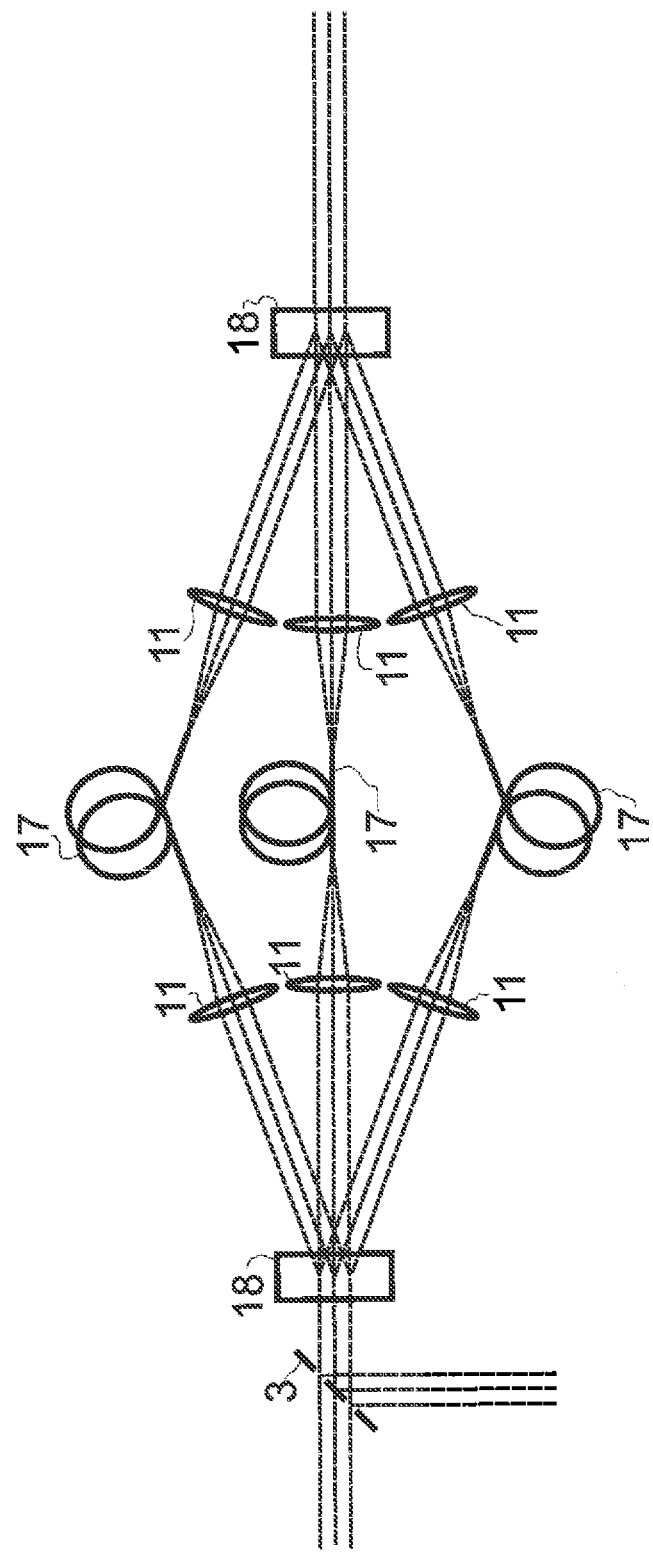
FIG. 7 shows an arrangement in which different wavelength bands in the visible spectral region are generated simultaneously or temporally sequentially in angularly spread partial beam paths from an individual broadband NIR laser source in different highly nonlinear photonic crystal fibers.

FIG. 7 shows means for frequency conversion in the form of an arrangement for simultaneous or sequential generation of spectrally narrowband visible frequency components as excitation light from illumination light of a broadband NIR laser light source. For this purpose, two optical elements 18 spread the beam path into angularly separated beam paths. This can take place either simultaneously if these optical elements 18 are diffractive optical elements (DOEs) or sequentially if they are adjustably deflecting optical elements such as acousto-optic deflectors (AODs), galvanometer scanner mirrors, electro-optic prisms or mirrored micro-optic electromechanical systems (MOEMS).

The arrangement shown in FIG. 8 in two views—FIG. 8A shows a side view and FIG. 8B shows a top view—is arranged as means for frequency conversion in its entirety in the common beam path C behind the detection pinhole diaphragm 13 of FIG. 1. Accordingly, the confocal imaging between pinhole diaphragm 13 and specimen 10 follows on the right-hand side of the drawing. On the left-hand side, broadband NIR illumination light is radiated in and initially impinges on an optical element 18 which is either a diffractive optical element (DOE), and accordingly generates a simultaneous angular spreading of the beam, or an adjustably deflecting optical element (AOD, MOEMS, galvanometer scanner, EO prism) so that the angular spreading takes place temporally sequentially. Every beam generated in this way is coupled through a lens 11 into a highly nonlinear photonic crystal fiber 17 in which the laser pulses generate new spectrally narrowband visible spectral components by radiation of dispersive waves. They are collimated via a second lens 11 and, depending on their wavelength, directed to assigned positions within the dispersion plane of a prism spectrometer and imaged by a lens 1. A microstructured mirror element 20 which deflects the generated excitation light in direction of imaging optics 21 of the prism spectrometer is arranged in this dispersion plane. The imaging optics 21 collimate the light from the dispersion plane and guide it in direction of the prism 22 which combines all of the excitation light components in one beam path which is relayed in direction of the specimen for fluorescence excitation. Fluorescent light originating from the specimen is now resolved into its spectral components at the prism 22 and imaged by imaging optics 21 into the dispersion plane, where it is directed, however, in another direction at the microstructured mirror element 20. The fluorescent light is then collimated by a pair of lenses 23 and imaged on a line detector 15a. In addition, a blocking filter 14 is provided for backscattered laser light. In this arrangement, the microstructured mirror element 20 provided for beam splitting of fluorescence and laser light can have different embodiment forms in which the geometric arrangement is to be adapted to the excitation beam path, detection beam path and illumination beam path. The mirror element 20 can be, for example, a MOEMS, a displaceable or exchangeable mask with micromirrors for reflecting laser light, or a displaceable or exchangeable mirror with transmission windows for transmitting excitation light. The latter case is represented in the drawing. Further, the spectral characteristics of the generated laser light interacting with the spectral resolution of the prism spectrometer are significant for the functioning of the arrangement and must be adapted to one another. A mismatch leads to chromatic angular errors in the common illumination beam and, correspondingly, to lateral chromatic aberrations in the imaging in the specimen 10.

Figure 9:
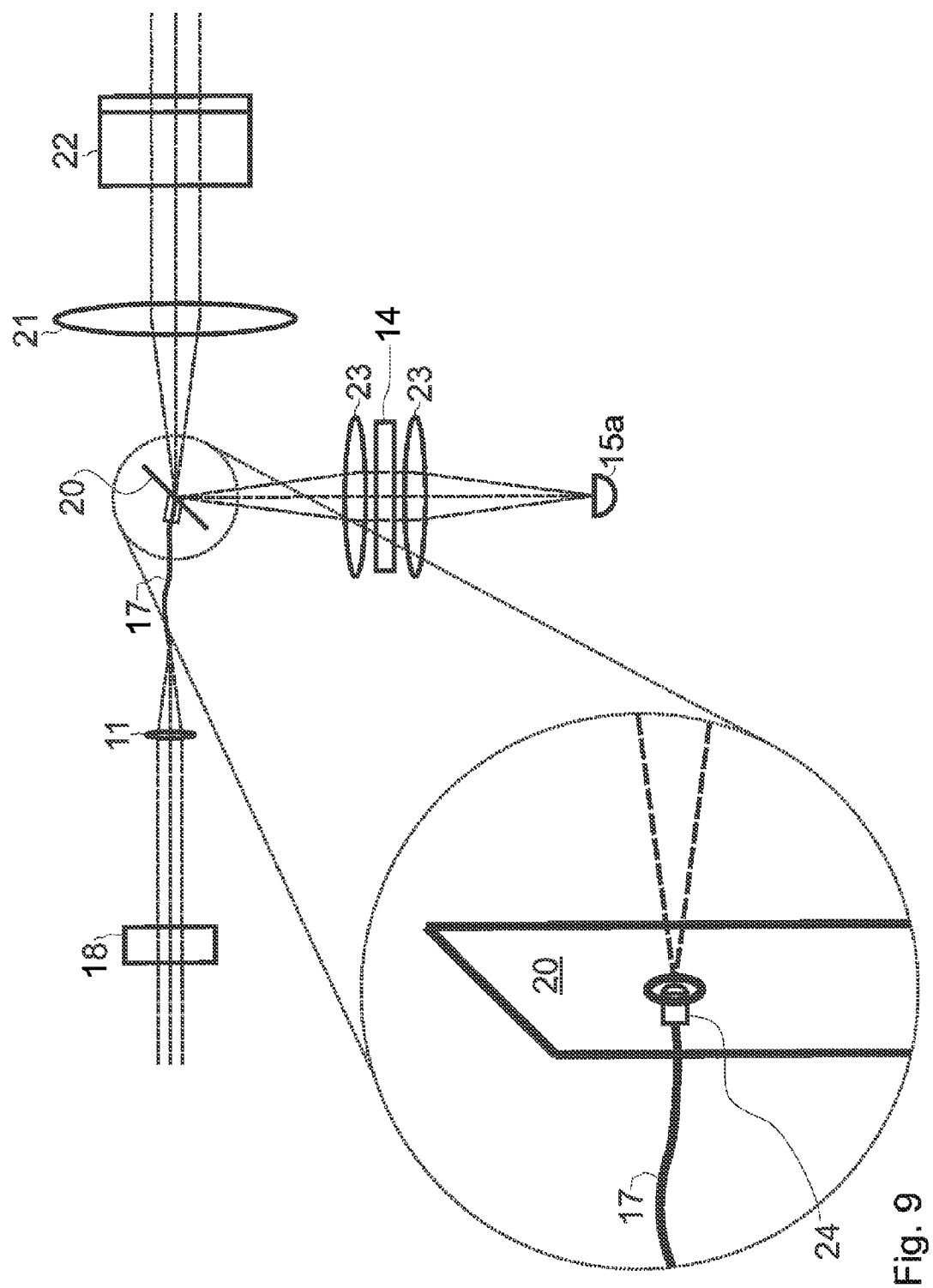
FIG. 9 shows a modification of the arrangement of FIG. 8 which allows an aperture matching of the fiber outputs by means of gradient index (GRIN) optics.

FIG. 9 shows a modification of the arrangement from FIG. 8 in which the fiber outputs of the various fibers 17 are provided with GRIN optics 24 such that the output apertures of the fibers are identical. In this way, the imaging optics of the connected spectrometer can be matched to the generated output aperture of the photonic crystal fibers such that all of the generated wavelengths generate identical beam radii. Further, the beam splitting of fluorescence and excitation light takes place at a mirrored plate as structured mirror element 20 which is arranged in the dispersion plane of the prism spectrometer. Holes are arranged in this plate at the positions corresponding to the generated wavelengths, and the GRIN optics 24 of the fiber outputs are glued into these holes. This section of the Figure is shown in an enlarged manner (indicated by a dotted border).

Figure 10:
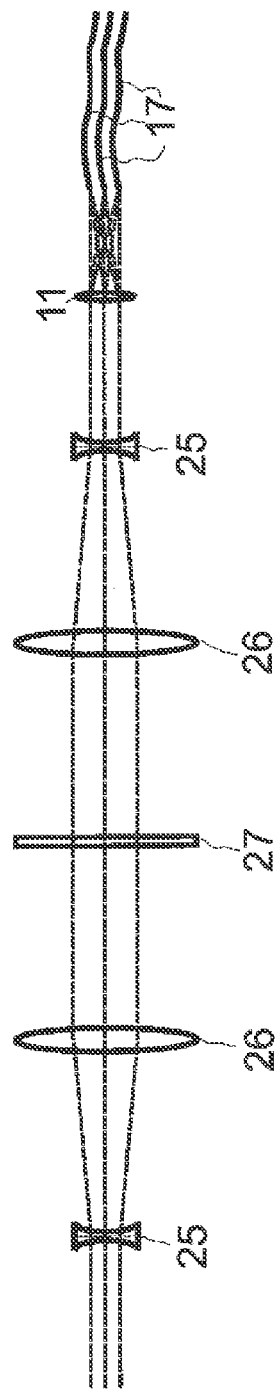
FIG. 10 shows an arrangement for simultaneously and programmably coupling broadband NIR laser source radiation into a bundle of photonic crystal fibers.

FIG. 10 shows a possible arrangement for simultaneously coupling broadband NIR laser radiation into different fiber inputs which are arranged in a bundle. To this end, the beam is expanded and narrowed again by two telescopes comprising, for example, lenses 25 and 26. A two-dimensional phase mask 27 is arranged in the expanded beam path. The phase mask 27 can be programmable if required. The phase manipulation is carried out here in precisely such a way that a plurality of focuses are formed in the focal plane of lens 11 at the positions of the different fiber cores. In this case it is particularly advantageous for the phase mask 27 to be programmable because this allows fast switching between the light paths, for example, when not all of the available fibers are to be used. Further, it is also possible, within limits, to adjust the light intensity radiated into each individual fiber. The phase mask 27 can be, for example, a spatial light modulator (SLM) which only retards the phase but does not change the amplitude. The visible excitation light is then coupled out and reunited according to one of the arrangements described above. The arrangement according to FIG. 10 can be used, for example, instead of the optical element 18 and lenses 11 and fibers 17 in the arrangement according to FIG. 8 or FIG. 9. The fiber inputs must then be bundled (in contrast to FIGS. 8 and 9).

The fiber outputs need not necessarily be combined in a bundle. This also applies when used in other arrangements than those in FIGS. 8 and 9. The fiber outputs may first be collimated, for example, as in FIG. 8, by means of a combination of lenses 11/19. (In an arrangement according to FIG. 8, the exiting light would be focused with these lenses at the correct position on the mirror element 20.) Alternatively, as in FIG. 9, each fiber output can have its own GRIN lens (as in FIG. 9). (In an arrangement according to FIG. 9, the outputs would be arranged correspondingly at the holes in the mirror element 20.)

If phase mask 27 is programmable, it is advisably connected to a control unit (not shown) which is adapted to reprogram the phase mask 27. For example, this can be a control unit which is connected to a microscope for controlling the other adjustable components thereof.

Figure 11:
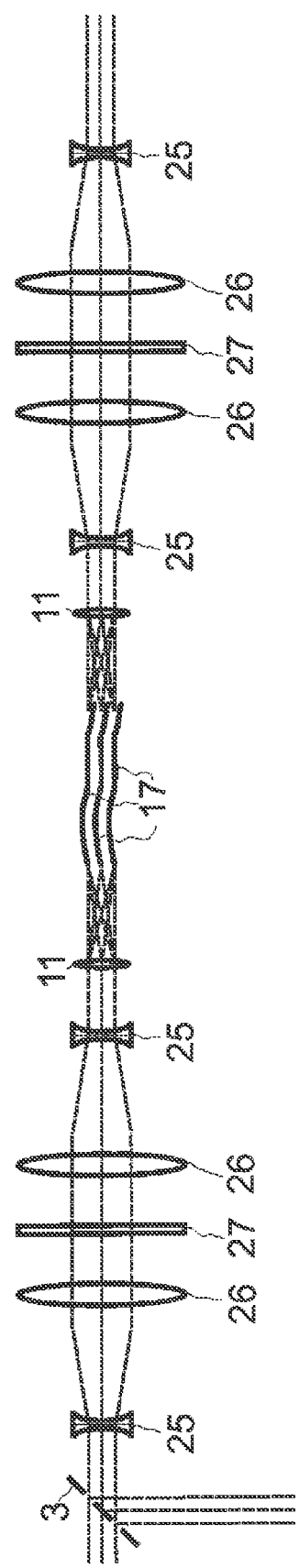
FIG. 11 shows a modification of the arrangement according to FIG. 10 as means for frequency conversion.

FIG. 11 shows how the arrangement shown in FIG. 10 can also be used in an arrangement according to FIG. 1 as means for frequency conversion. This is carried out in a manner analogous to the alternative arrangements according to FIGS. 4 to 7 in the common portion of the microscope beam path (not shown for the sake of clarity). To this end, a second arrangement according to FIG. 10 is provided on the other side of the photonic fibers 17, where the optical elements are in reverse order. In this way, the beam which is split on the one side of the fibers 17 is combined again on the other side. Switching and/or programming between the phase masks 27 is carried out differently because of the frequency conversion.

In all of the embodiment forms, a fine tuning of the generated wavelengths of the excitation light can be carried out by tuning the fundamental wavelength of the illumination light. The required quantity of highly nonlinear photonic crystal fibers can accordingly be limited so that the entire visible spectral region can be covered in principle.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS 1 light source
2 AOTF
3 main beamsplitter
4 nonlinear crystal
5 NIR blocking filter
6 adjustable deflecting mirror
7 scanning objective
8 tube lens
9 microscope objective
10 specimen
11 4f lens arrangement
12 4f lens arrangement
13 confocal diaphragm
14 notch filter for excitation light
15 detector
16 nonlinear waveguide
17 photonic crystal fiber
18 optical element
19 lens
20 structured mirror element
21 imaging optics for prism spectrometer
22 prism
23 lens pair
24 GRIN optics
25 lens
26 lens
B illumination beam path
C common beam path
D detection beam path

The invention claimed is:

1. A confocal scanning microscope for fluorescence excitation by means of excitation light, comprising:
    an illumination beam path;
    a detection beam path;
    a main beamsplitter which couples part of the illumination beam path and part of the detection beam path to form a common beam path;
    an adjustable deflection unit in the common beam path;
    a means for frequency conversion which is arranged in the common beam path between the main beam splitter and a part of the common beam path; and
    in addition to the main beamsplitter, a filter for excitation light is arranged in the detection beam path.

2. The confocal scanning microscope according to claim 1;
    wherein the main beamsplitter is a spectral edge filter.

3. The confocal scanning microscope according to claim 1;
    wherein the means for frequency conversion are formed as at least one optically nonlinear medium.

4. The confocal scanning microscope according to claim 3;
    wherein the optically nonlinear medium is arranged in a focal plane of the common beam path or at least in the area of such a focal plane.

5. The confocal scanning microscope according to claim 3;
    wherein the at least one optically nonlinear medium is configured to convert infrared light into visible light.

6. The confocal scanning microscope according to claim 4;
    wherein the optically nonlinear medium is arranged in the center of a 4f arrangement.

7. The confocal scanning microscope according to claim 1;
    wherein a confocal diaphragm is arranged confocally in the detection beam path.

8. The confocal scanning microscope according to claim 7;
wherein the confocal diaphragm is formed by the means for frequency conversion.

9. The confocal scanning microscope according to claim 7,
wherein the confocal diaphragm is a pinhole diaphragm or a slit diaphragm, and is arranged confocally in the common beam path.

10. The confocal scanning microscope according to claim 1, further comprising:
a tunable light source arranged in the illumination beam path configured to emit at least one of a plurality of different first spectral bands;
wherein the filter for the excitation light is adjustable for blocking at least one of various second spectral bands which arise from the frequency conversion from the first spectral bands.

11. The confocal scanning microscope according to claim 10;
wherein the filter is configured to be tilted with respect to the detection beam path for adjusting one of the second spectral bands to be blocked.

12. The confocal scanning microscope according to claim 10;
wherein the tunable light source is configured to emit at least one of a plurality of different infrared spectral bands.

13. The confocal scanning microscope according to claim 1;
wherein the illumination beam path comprises an adjustable filter configured to adjust different spectral bands of the illumination light.

14. The confocal scanning microscope according to claim 13;
wherein the adjustable filter is an acousto-optic tunable filter.

15. The confocal scanning microscope according to claim 1;
wherein the means for frequency conversion are connected to a drive for moving the means for frequency conversion out of the common beam path and into the common beam path.

16. The confocal scanning microscope according to claim 15;
wherein the drive which moves the means for frequency conversion out of the common beam path and into the common beam path, is configured to alternatively move one of a plurality of means for frequency conversion into the common beam path.

17. The confocal scanning microscope according to claim 1;
wherein the means for frequency conversion comprise at least one element of the group of elements consisting of:
periodically poled nonlinear crystal;
periodically poled nonlinear optical waveguide; and
nonlinear photonic crystal fiber.

18. The confocal scanning microscope according to claim 1;
wherein, in addition to the deflection unit, adjustably deflecting optical elements are arranged the common beam path, and are configured to temporally sequentially spread the beam path and to recombine the beam path.

19. The confocal scanning microscope according to claim 1;
wherein the main beamsplitter is:
a two-dimensional matrix of micro-optomechanical systems; or
a two-dimensional micromirror matrix; or
a mirror with at least one transmission window.

20. An operating method for a confocal scanning microscope for fluorescence excitation, comprising:
coupling illumination light, emitted by a light source in a first spectral band, along an illumination beam path via a main beamsplitter into a common beam path shared with a detection beam path;
converting the coupled illumination light within the common beam path into a different spectral band as excitation light;
guiding the converted illumination light, via a deflection unit and an objective, to a specimen;
receiving, from the specimen, light via the objective along the common beam path;
guiding the received light, via the main beamsplitter and through a filter for the excitation light, to a detector, and
optoelectronically converting the light received by the detector.

21. A non-transitory computer-readable medium which stores a computer program for controlling a confocal scanning microscope, the computer program performing the method according to claim 20.

22. The method according to claim 20;
wherein the light received by the detector is optoelectronically converted by adjustment of a tunable light source to one of a plurality of first spectral bands, and adjustment of the filter for the excitation light to corresponding second spectral bands.

23. A control unit for controlling a confocal scanning microscope, where the control unit is configured to implement the method according to claim 20.

* * * * *